Oct. 24, 1961 R. E. FEBRE 3,005,275
BULLDOZER
Filed May 28, 1958 5 Sheets-Sheet 1

INVENTOR
ROBERTO E. FEBRE
ATTORNEY

Oct. 24, 1961    R. E. FEBRE    3,005,275
BULLDOZER

Filed May 28, 1958    5 Sheets-Sheet 3

INVENTOR
ROBERTO E FEBRE
Paul O. Pippel
ATTORNEY

Oct. 24, 1961  R. E. FEBRE  3,005,275
BULLDOZER
Filed May 28, 1958  5 Sheets-Sheet 4
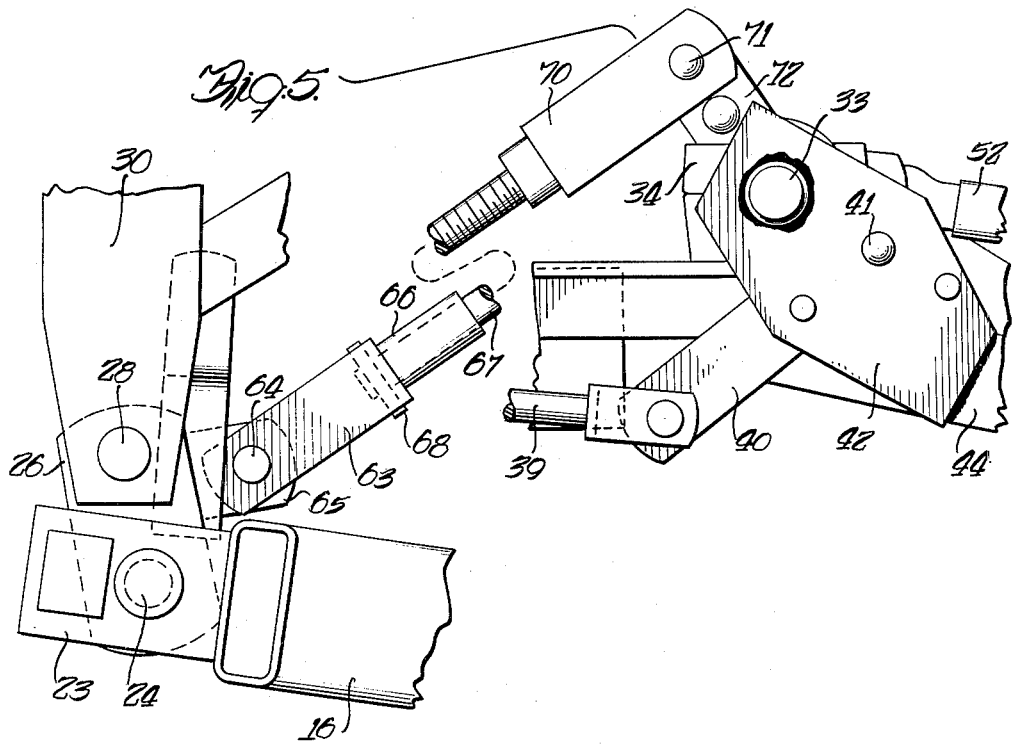
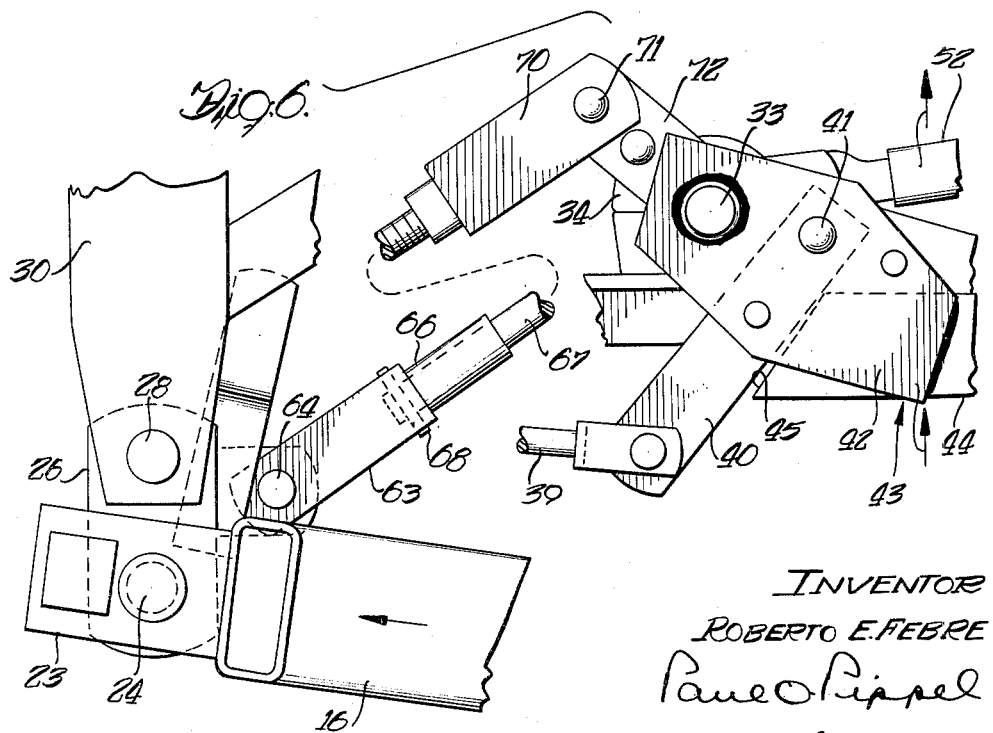
INVENTOR
ROBERTO E. FEBRE
Paul O. Pippel
ATTORNEY

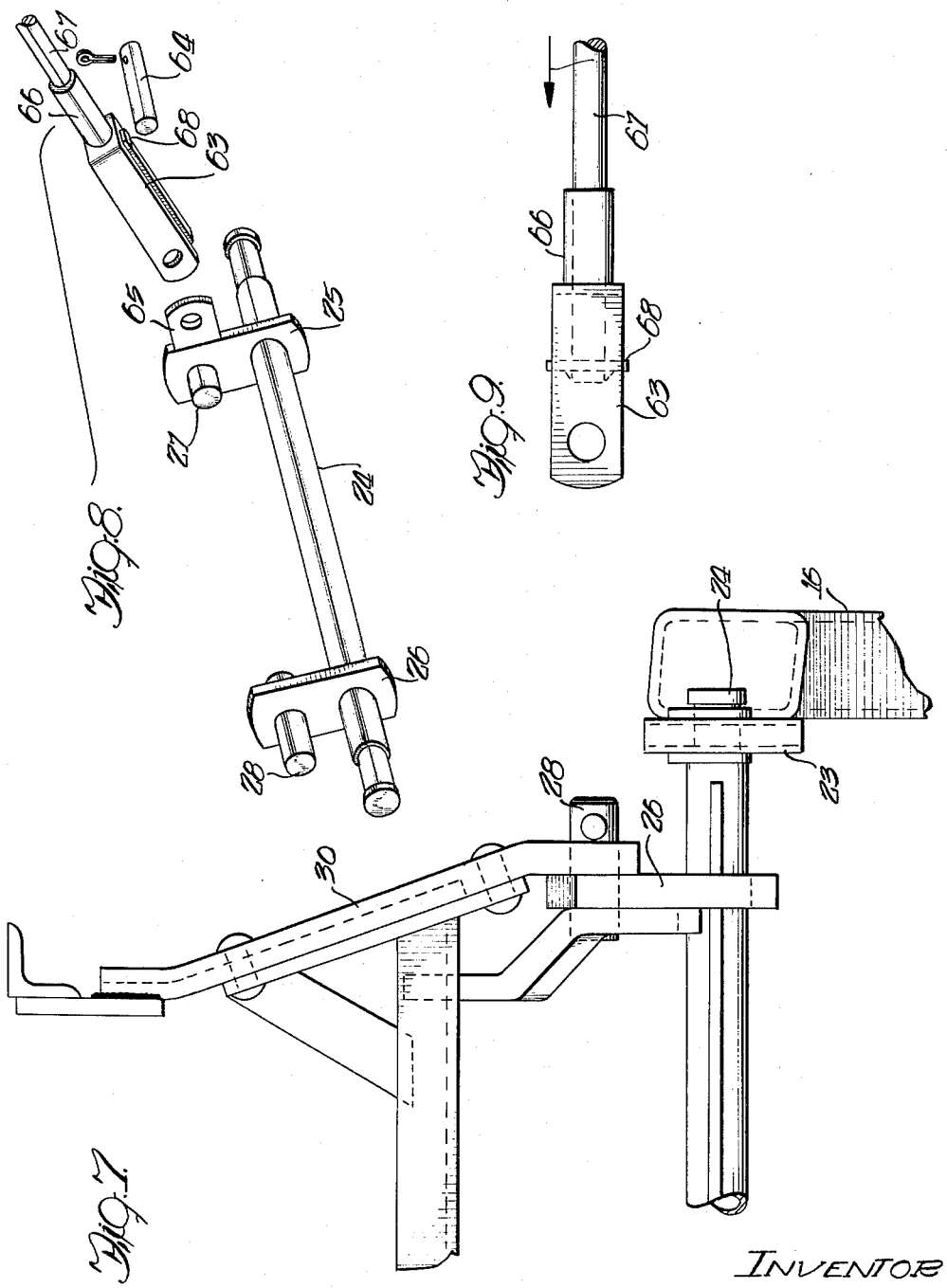

United States Patent Office 3,005,275
Patented Oct. 24, 1961

3,005,275
BULLDOZER
Roberto E. Febre, Saltillo, Coahuila, Mexico, assignor to International Harvester Company, Chicago, Ill., a corporation of New Jersey
Filed May 28, 1958, Ser. No. 738,404
4 Claims. (Cl. 37—144)

This invention relates to tractor implements and particularly to bulldozers and the like. More specifically, the invention concerns means for controlling the operation of a bulldozer.

A machine of the bulldozer type generally comprises a wide, somewhat concave blade extending transversely of and in front of a tractor or other propelling vehicle, and it is pushed thereby to move dirt and the like. The lower end of the blade is adapted to penetrate the earth to the desired depth and the resistance to the advance of the tractor and blade depend upon the depth of penetration and the character of the soil. Customarily, when abnormal resistance to advance of the blade is encountered, the tractor power lift means is actuated by the operator to raise the tool from the ground or to a shallower depth to lighten the propelling load until normal soil conditions are again encountered, or the implement is backed and again moved forwardly at shallower depths until the required dirt is removed. This procedure demands constant vigilance on the part of the tractor operator, and an object of the present invention is the provision of an improved bulldozer attachment for tractors.

Another object of the invention is the provision of a bulldozer or the like having improved means for controlling the operation thereof.

Another object of the invention is the provision of a bulldozer or the like having means for automatically regulating the operating depth thereof to compensate for changes in soil conditions.

A further object of the invention is the provision of an improved bulldozer having automatic depth control, wherein the pressure of the soil against the blade is converted into lifting energy directed toward automatically raising the blade when abnormal soil conditions are encountered.

Other objects and advantages of the invention will become clear from the following detailed description when read in conjunction with the accompanying drawings, wherein:

FIGURE 5 shows a portion of the automatic control mechanism for the bulldozer blade in one position of the parts;

FIGURE 6 is a view similar to FIGURE 5 with the parts in another position;

FIGURE 7 is a plan view on an enlarged scale of a portion of the structure shown in FIGURE 2;

FIGURE 8 shows the hitch structure by which the bulldozer blade is connected to the tractor to be pushed thereby, and FIGURE 9 shows a portion of the push rod by which pressure on the bulldozer blade is transmitted to the lifting apparatus.

Figure 1:
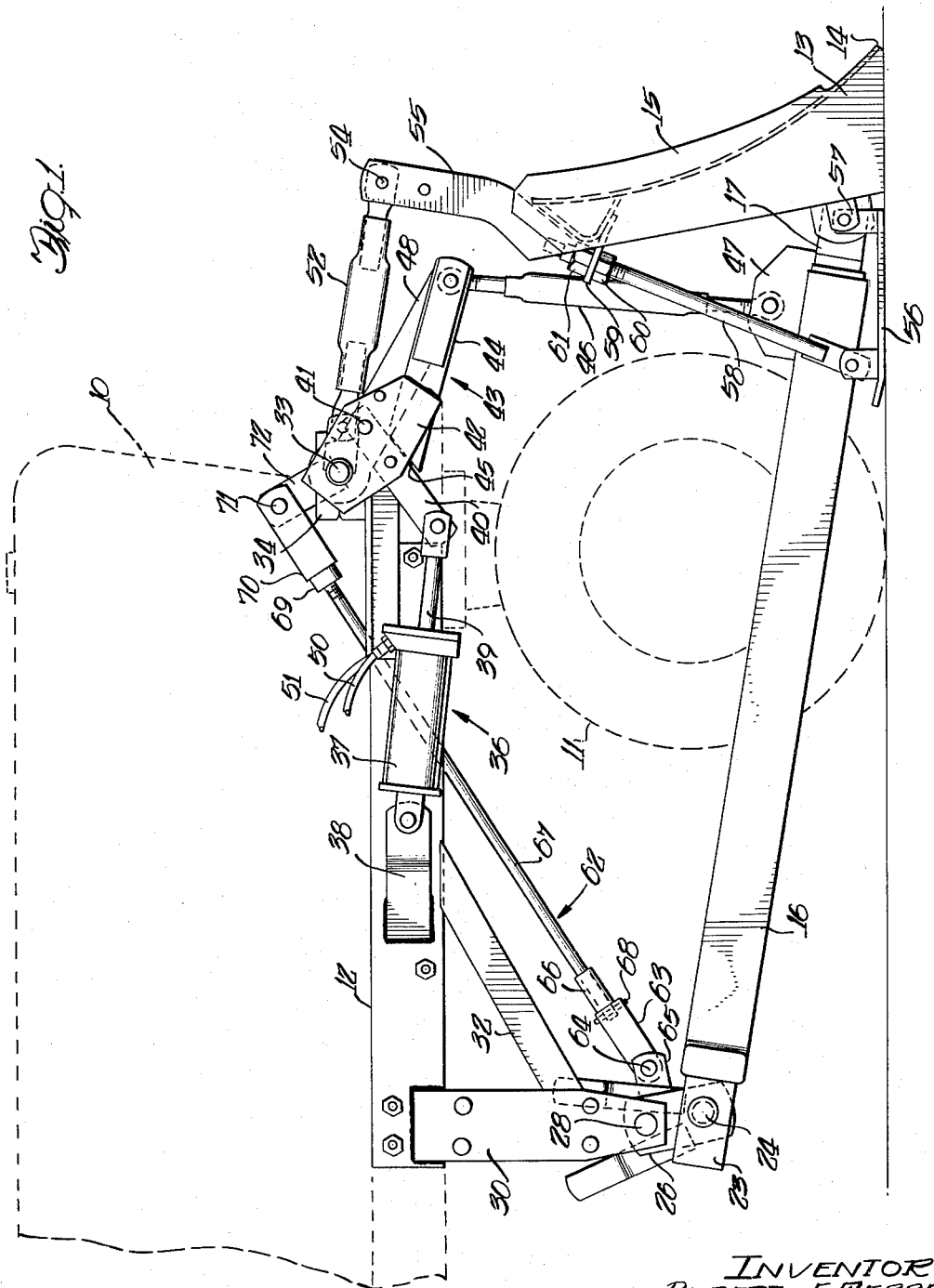
FIGURE 1 is a view in side elevation of the front end of a tractor having mounted thereon an implement incorporating the features of this invention.
Figure 2:
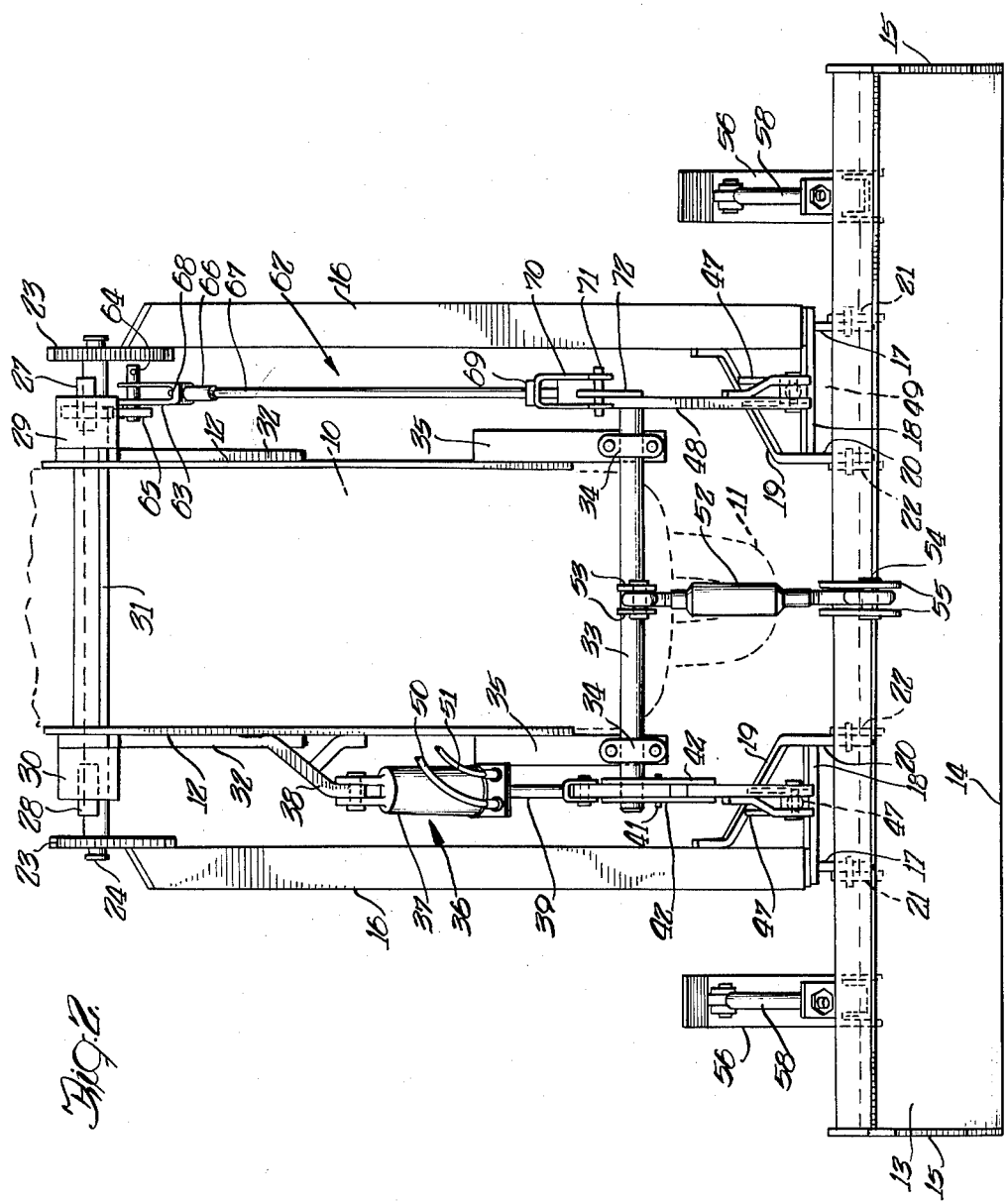
FIGURE 2 is a plan view of the bulldozer structure shown in FIGURE 1.
Figure 3:
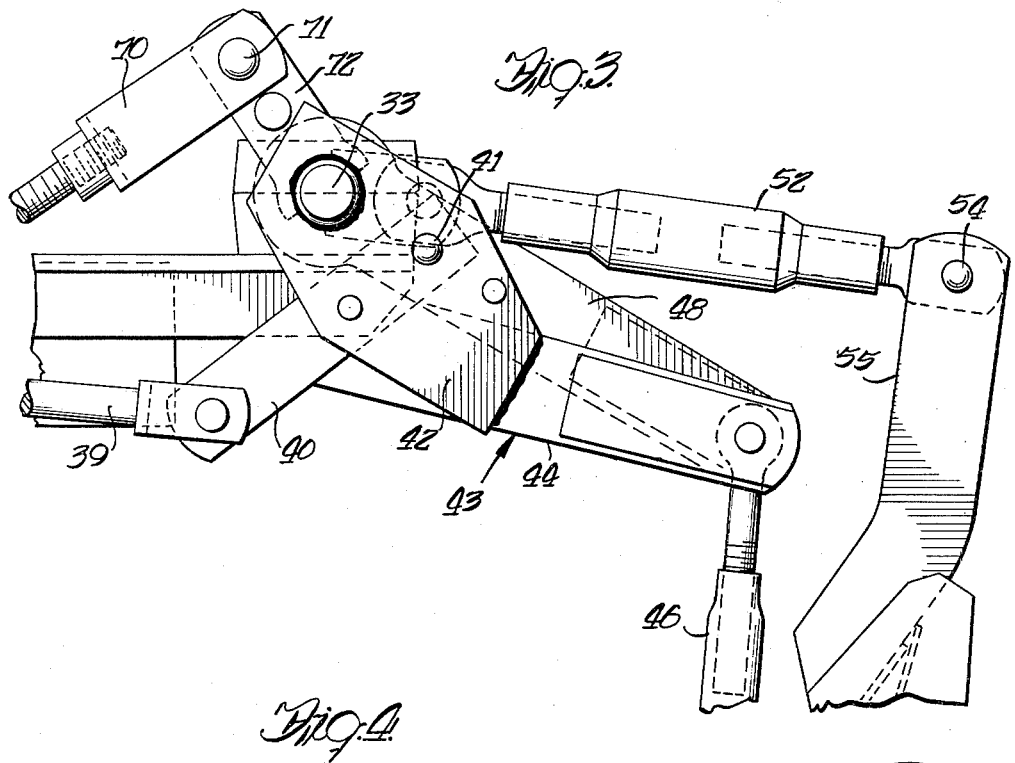
FIGURE 3 is an enlarged detail of a portion of the lifting apparatus by which the bulldozer blade is raised and lowered, the position of the parts corresponding to the operating position of the bulldozer blade.
Figure 4:
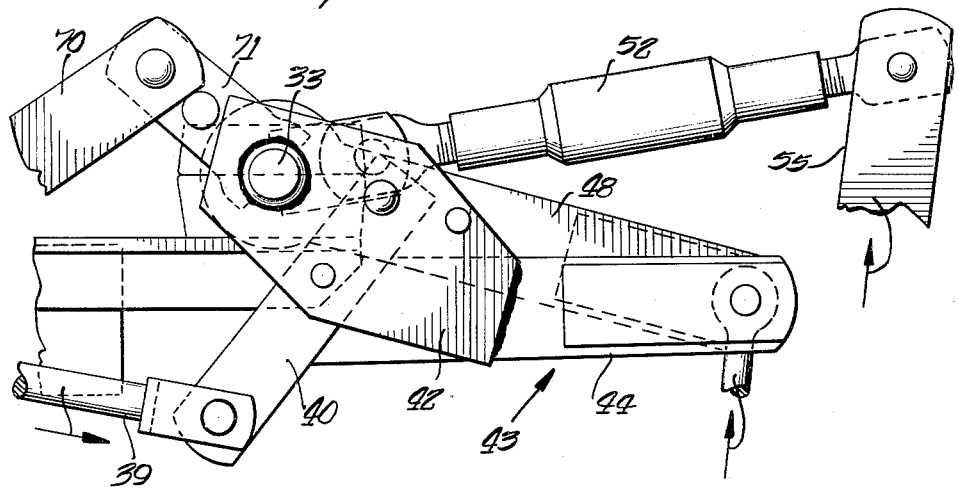
FIGURE 4 is a view similar to FIGURE 3 showing the position of the parts when the blade is in raised position.

The numeral 10 designates the body of a tractor, only the forward portion of which is shown, having front wheels 11 and mounting plates 12 secured to the sides thereof.

The implement with which this invention is concerned is a bulldozer comprising an elongated transversely extending concave blade 13 which, for the purposes of this invention, may be regarded as of conventional construction. Blade 13 has a forward lower earth-penetrating edge 14 and side plates 15 and is positioned forwardly of the tractor front wheels.

A pair of longitudinally extending beams or push bars 16 are provided, one on each side of the tractor, for attachment to the blade 13. At the forward end of each beam or push bar 16 is an extension 17 and a transversely extending brace 18 secured to an angle member 19 which is affixed at its rear end to the associated push bar 16 and is provided with an extension 20 at its forward end parallel to extension 17. The extensions 17 and 20 are pivotally connected to a pair of lugs 21 and 22, respectively, affixed to the rear of the blade 13.

The rear end of each push bar 16 has affixed thereto an extension 23 apertured to pivotally receive the reduced diameter end of a transversely extending shaft 24 extending from one side of the tractor body to the other rearwardly of the front wheels 11. Shaft 24 constitutes pivot means supporting the rear ends of the push bars 16 for vertical swinging movement thereof to raise and lower the bulldozer blade 13, and also functions as the hitch member through which the propelling force of the vehicle is transmitted to the bulldozer blade.

As shown particularly well in FIGURE 8, shaft 24 is suspended in the form of a cradle from the tractor by having affixed thereto laterally spaced upstanding ears 25 and 26, in the upper ends of which are mounted pivot pins 27 and 28, respectively, which extend parallel to and above the shaft 24. Pins 27 and 28 are pivotally received in the lower ends, respectively, of a pair of depending brackets 29 and 30 affixed at their upper ends to the side plates 12 of the tractor. Bracing for the brackets 29 and 30 is provided by a cross piece 31 and straps 32. It should now be clear that shaft 24 is capable of longitudinally swinging relative to the tractor about the pivots 27 and 28 and that, therefore, push bars 16 and bulldozer blade 13 are also capable of such limited longitudinal movement.

Vertical adjustment of the operating position of the bulldozer of this invention and movement thereof between operating and transport positions is accomplished by the provision of lifting apparatus including a transversely extending rock shaft 33 rockably mounted in bearings 34 carried by a pair of supporting brackets 35.

Power lift means in the form of a hydraulic ram 36 comprises a cylinder 37 pivotally anchored to a support 38 affixed to the side of the tractor, and a piston rod 39 pivotally connected to the lower end of a lever arm 40 which, in turn, is pivoted at 41 between a pair of plates 42 forming a part of a lift arm 43 extending forwardly from the rock shaft 33. Another part of lift arm 43 is an extension 44 which is welded between the plates 42 and has a rear angled edge 45 which is engageable with lever arm 40. The extension 44 of lift arm 43 is bifurcated at its forward end and pivotally connected to the upper end of a lift link 46 adjustable in length, and preferably in the form of a turnbuckle, the lower end of which is pivotally mounted between a pair of lugs 47 affixed to the brace 18 and angle member 19 of the right hand push bar 16.

Another lift arm 48 is secured to the left hand end of rock shaft 33 and is also bifurcated at its forward end and pivotally connected to another lifting link 49 similar to lifting link 46 and likewise pivotally connected at its lower end to a pair of lugs 47 affixed to the cross brace 18 and angle member 19 on the left hand push bar 16. The lift links 46 and 49, being in the form of turn-buckles, are adjustable in length to make minor adjustments in the working position of the bulldozer blade.

Fluid under pressure is supplied to the cylinder 37 through hose lines 50 and 51 from a suitable pressure source, not shown, on the tractor. Raising of the implement to an inoperative position on the tractor is accomplished by extending piston rod 39 in cylinder 37 to rock lever arm 40 about its pivot 41 on the lift arm 43. Upon engagement of lever 40 with the rear edge 45 of extension 44, lift arm 43 is rocked counterclockwise about the axis of rock shaft 33 to raise the bulldozer to an inoperative position about the pivot of push bars 16 on shaft 24. Upon retraction of piston rod 39 in the cylinder the implement descends by its own weight and by the action of the hydraulic ram to return the implement to its operating position. Limited floating of the implement in operation is accommodated by the lost motion provided between lever 40 and the rear edge 45 of extension 44. Adjustment of the pitch or angle of penetration of the bulldozer blade 13 is accomplished by the provision of another turnbuckle 52 pivotally mounted between a pair of lugs 53 affixed to the center of rock shaft 33 and extending forwardly for pivotal connection to a pin 54 carried between the upper ends of a pair of posts 55 affixed to and extending upwardly from the blade 13.

The bulldozer of this invention is also provided with a pair of runners 56 which extend rearwardly adjacent opposite ends of the blade 13. Each runner is pivotally connected to a lug 57 secured to the rear surface of the bulldozer blade and the rear end of the runner is pivotally connected to the lower end of a rod 58, the upper end of which is slidably receivable in an opening provided in a member 59 affixed to the rear end of the blade 13 near its upper end. Rod 58 is threaded to receive a lug 60 engaging the lower face of member 59 and another nut 61 engaging the upper face of the member 59. The position of runner 56 relative to the blade 13 is adjusted by regulating the position of nuts 60 and 61 on rod 58.

Rearward swinging of shaft 24 about the axes of pins 27 and 28 and consequent rearward movement of the push bar 16 and blade 13 occurs as the result of the pressure of the soil rearwardly against the face of the bulldozer blade 13. In order to automatically control the operation of the bulldozer blade 13 rearward movement of the blade 13 and push bar 16 as a result of excess soil pressure against the blade is opposed or resisted by the provision of a thrust member in the form of a link or rod 62 comprising a clevis 63 pivotally mounted upon a pin 64 carried by a lug 65 affixed to the forward edge of the ear 25 at the lefthand end of shaft 24. Clevis 63 is provided with a sleeve portion 66 in which is slidably receivable the rear end of a rod 67 having a cross head 68 receivable in the clevis 63 and engageable therewith to accommodate limited sliding movement of the rod 67 in the sleeve 66 while preventing displacement of the rod 67 therefrom. The upper end of rod 67 is threaded for reception in the threaded base 69 of another clevis 70 which is pivotally connected to a pin 71 carried at the upper end of an arm 72 affixed to the left hand end of rock shaft 33.

Rod 67 telescopes in sleeve 66 to accommodate the raising and lowering of the implement. Abnormal pressure against the blade 13 causing the latter and the push bars 16 to move rearwardly about the axes of the pins 27 and 28, swings lug 65 clockwise, as viewed in FIGURE 1, pulling on link 62 and rocking arm 72 and shaft 33 counterclockwise, as viewed in FIGURE 1, swinging lift arms 43 and 48 upwardly to impart lift to the earth-working tool 13. Such abnormal pressure against the bulldozer is caused by encountering obstructions or hard soil, and as shown, this abnormal pressure is translated through link 62 into a lifting force which tends to lighten the propelling force required to push the blade through the soil. When the obstruction is passed or the blade again encounters normal soil resistance it automatically returns to its operating position.

The amount of rearward movement of the push bars 16 and blade 13 which is translated into the lifting force on the bulldozer blade may be regulated by removing pins 71 and turning clevis 70 on rod 67 to vary the effective length of link 62.

It is believed that the operation of the depth control apparatus for the bulldozer of this invention will be clearly understood from the foregoing description. It should likewise be understood, however, that the invention has been described only in its preferred embodiment and that modifications may be made therein without departing from the spirit of the invention or the scope of the appended claims.

What is claimed is:

1. A bulldozer attachment for a tractive vehicle, comprising a transverse blade, a rock shaft rockably mounted on the vehicle, lift arms carried by the rock shaft and operatively connected to the blade for raising and lowering the latter upon rocking the shaft, a pair of laterally spaced push bars pivotally connected to said blade and extending rearwardly therefrom, a hitch member pivoted on the vehicle for swinging relative thereto, means pivotally connecting the rear ends of said beams to said member for swinging therewith, said hitch member being swingable relative to the vehicle in response to pressure of the soil against said blade, a thrust member operatively connecting said hitch member to said rock shaft to actuate said lift arms to lift the blade upon movement of said hitch member relative to the vehicle, and power transmitting means on the vehicle operatively connected to said rock shaft for rocking the rock shaft to raise and lower the blade, said power transmitting means including lost motion means accommodating said actuation of said lift arms upon movement of said hitch means relative to the vehicle.

2. A bulldozer attachment for a tractive vehicle, comprising a transverse blade, a rock shaft rockably mounted on the vehicle, lift arms carried by the rock shaft and operatively connected to the blade for raising and lowering the latter upon rocking the shaft, a pair of laterally spaced push bars pivotally connected to said blade and extending rearwardly therefrom, a hitch member pivotally mounted on the vehicle for swinging movement relative thereto, means pivotally connecting the rear ends of said push bars to said hitch member at a location removed from the latter's pivot on the vehicle, whereby the pivotal connection of each of said push bars to said hitch member is movable in response to said pressure on said blade, and means resisting the movement of said bars in one direction comprising a rod operatively connected at one end to said push bars and at the other end to said rock shaft, said rod being effective to transmit the movement of said push bars relative to the vehicle to said rock shaft to rock the rock shaft in one direction, and said rod including relatively slidable parts accommodating rocking of said shaft in the other direction.

3. An implement attachment for a tractor having power lift means thereon, comprising a transverse blade in front of the tractor, lift arms mounted on the tractor connected to said blade, means connecting said power lift means to said arms for swinging the latter to raise and lower the blade, a pair of laterally spaced push bars pivotally connected to said blade and extending rearwardly therefrom, means accommodating rearward movement of said push bars for connecting the rear ends of said bars to the tractor, comprising a transverse hitch member having its ends pivotally connected to said push bars, arms secured to said hitch member and extending vertically therefrom, means pivotally connecting said arms to the tractor to accommodate movement of said hitch member with said push bars, and means resisting said rearward movement of said push bars, comprising a rod operatively connected to said hitch member and said lift arms, said arm being effective to swing said lift arms in a direction to raise the blade in response to rearward movement of said push bars.

4. An implement attachment for a tractor having power lift means thereon, comprising a transverse blade in front of the tractor, lift arms mounted on the tractor connected to said blade, means connecting said power lift means to said arms for swinging the latter to raise and lower the blade, a pair of laterally spaced push bars pivotally connected to said blade and extending rearwardly therefrom, means accommodating rearward movement of said push bars for connecting the rear ends of said bars to the tractor, comprising a transverse hitch member having its ends pivotally connected to said push bars, arms secured to said hitch member and extending vertically therefrom, means pivotally connecting said arms to the tractor to accommodate movement of said hitch member with said push bars, means resisting said rearward movement of said push bars comprising a rod operatively connected to said hitch member and said lift arms, said arm being effective to swing said lift arms in a direction to raise the blade in response to rearward movement of said push bars, and lost motion means in the connection of said power lift means to said lift arms accommodating said raising of the blade independently of said power lift means.

References Cited in the file of this patent
UNITED STATES PATENTS

| | | |
|---|---|---|
| 2,425,806 | Ing | Aug. 19, 1947 |
| 2,446,136 | Jarmin | July 27, 1948 |
| 2,545,739 | Martin | Mar. 20, 1951 |
| 2,547,438 | Burkholder | Apr. 3, 1951 |
| 2,785,616 | Jones | Oct. 5, 1953 |
| 2,675,751 | Weber | Apr. 20, 1954 |
| 2,695,467 | Woods | Nov. 30, 1954 |